March 17, 1931. C. A. PRATT 1,796,943
LOADING MACHINE
Filed Jan. 18, 1929 3 Sheets-Sheet 1
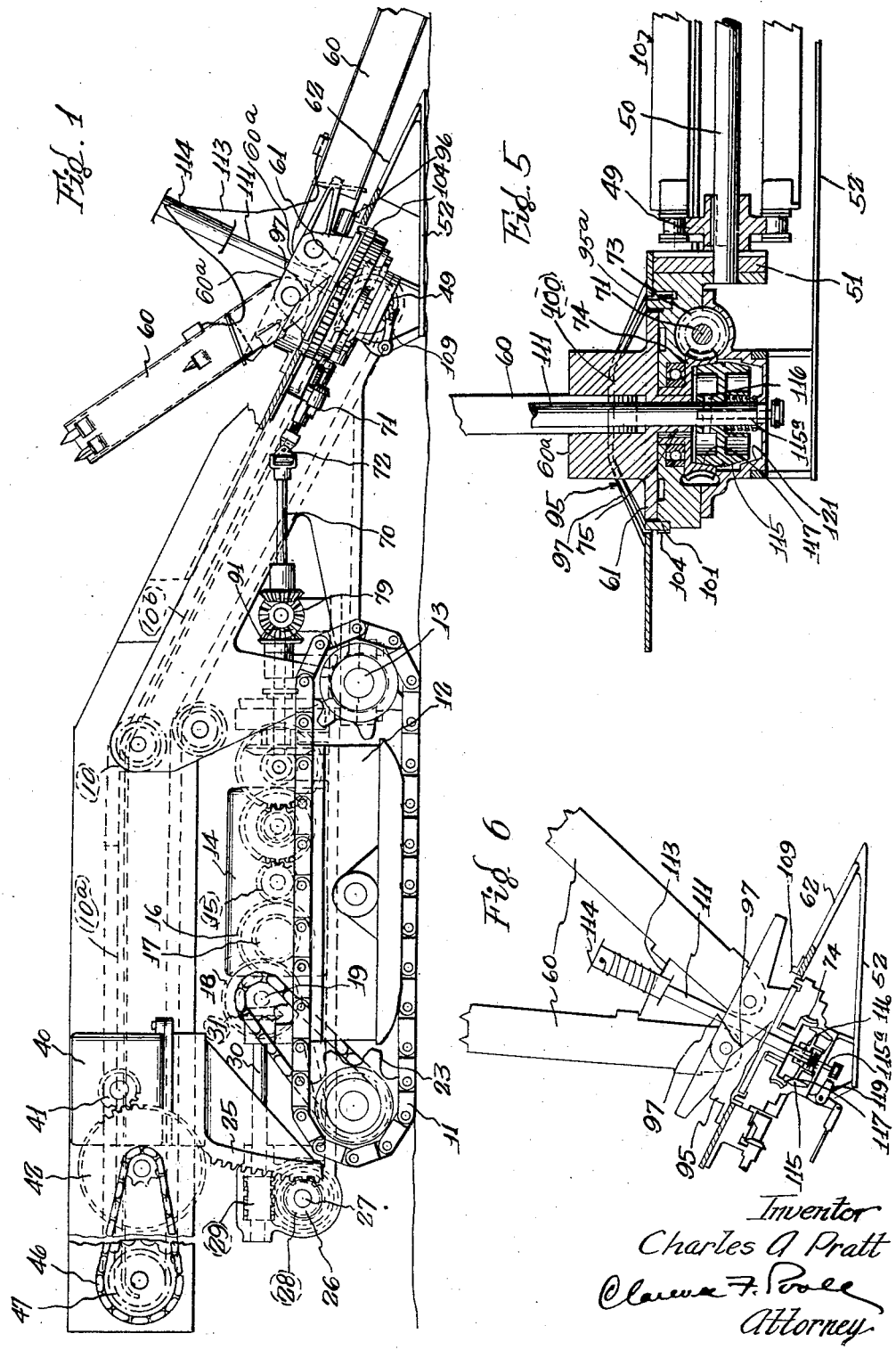
Inventor
Charles A. Pratt
Clarence F. Poole
Attorney March 17, 1931.  C. A. PRATT  1,796,943
LOADING MACHINE
Filed Jan. 18, 1929  3 Sheets-Sheet 2
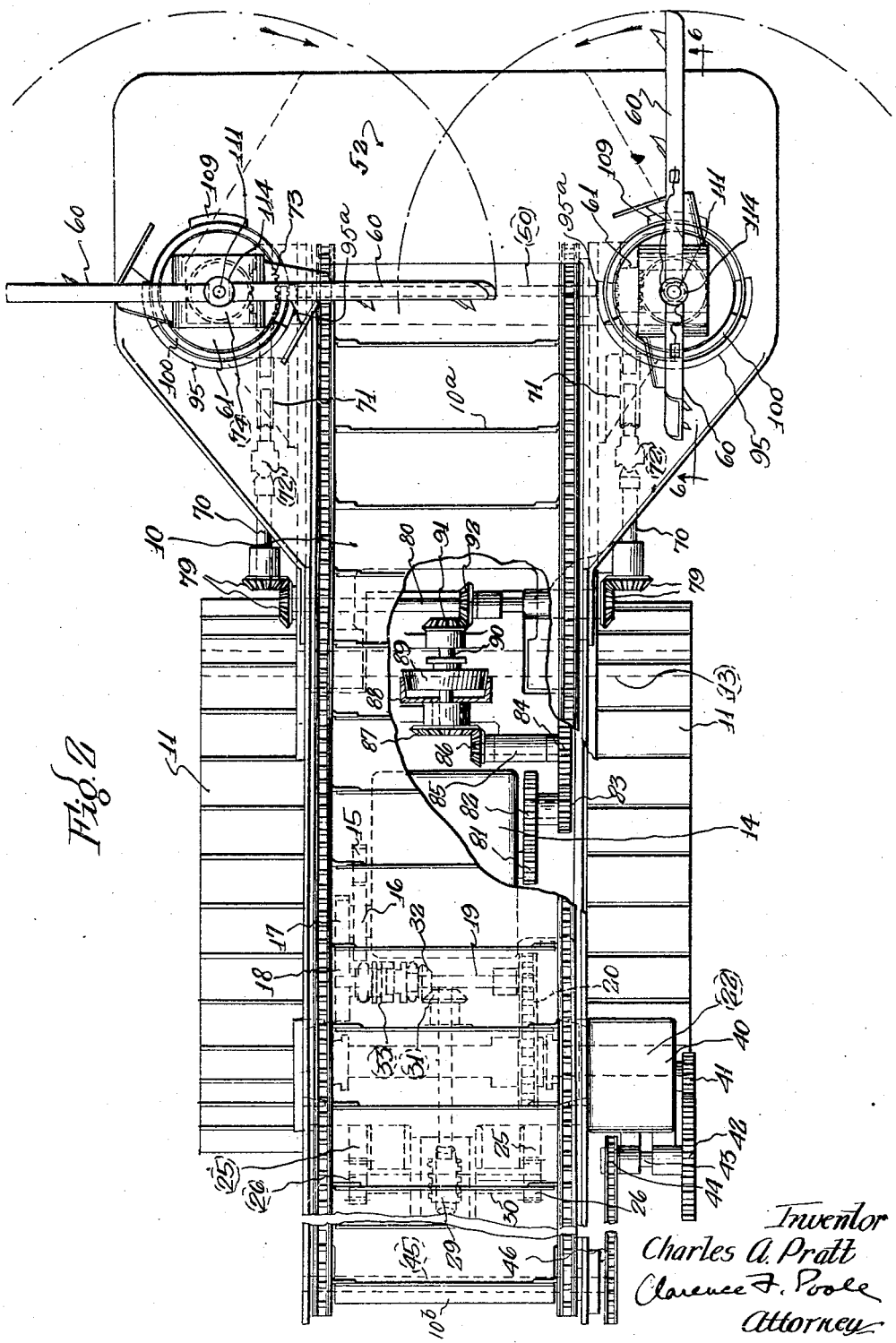

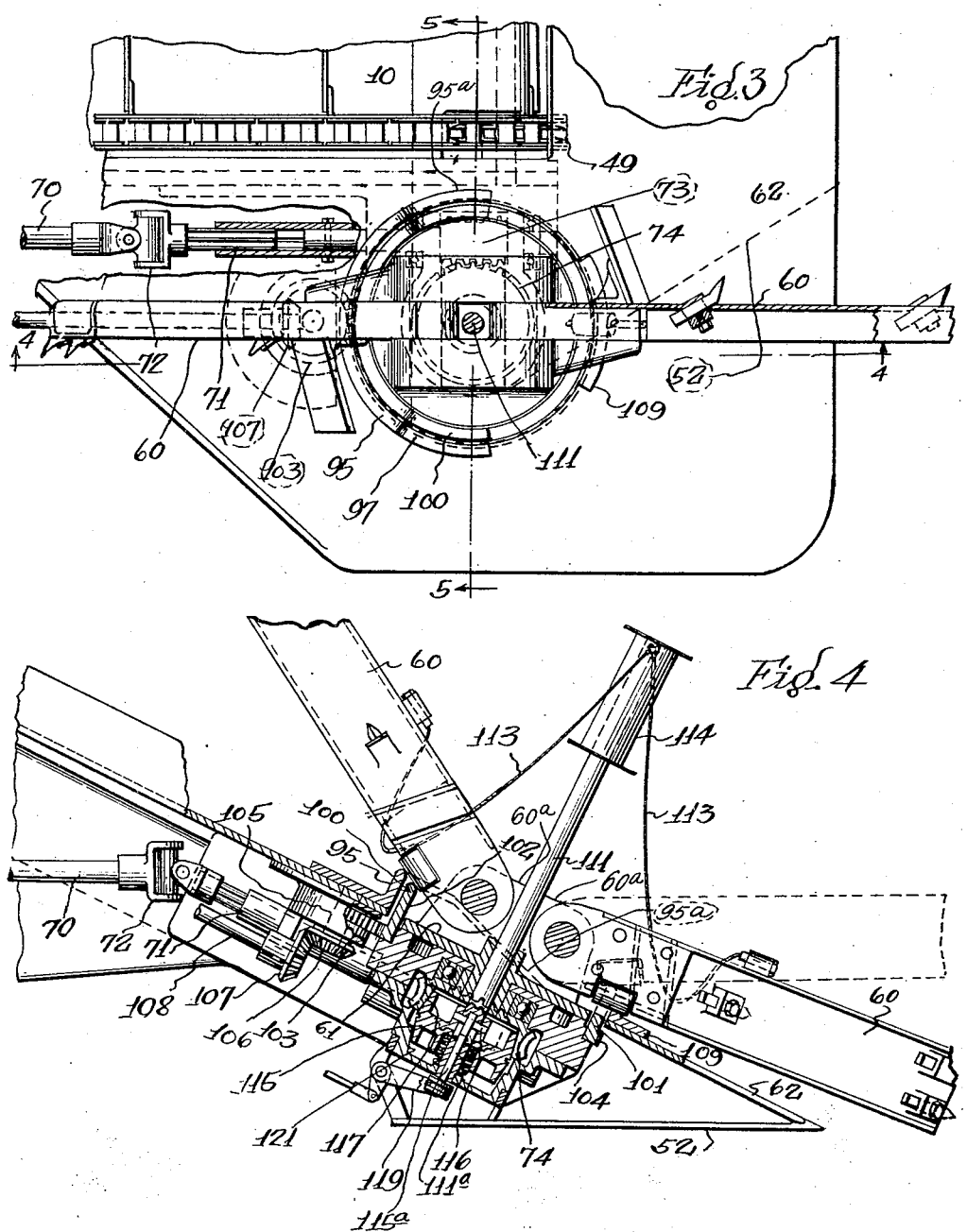

Patented Mar. 17, 1931

1,796,943

UNITED STATES PATENT OFFICE

CHARLES A. PRATT, OF CHICAGO, ILLINOIS, ASSIGNOR TO GOODMAN MANUFACTURING COMPANY, OF CHICAGO, ILLINOIS, A CORPORATION OF ILLINOIS

LOADING MACHINE

Application filed January 18, 1929. Serial No. 333,337.

This invention relates to improvements in loading machines and more particularly to loading machines such as are used in mines and adapted to gather loose material and deposit it upon a travelling conveyor for discharge into cars or the like.

In carrying out my invention I provide an improved form of rotary gathering mechanism including arms adapted to have horizontal sweeping movement so as to engage and carry the loose material onto the conveyor, and with improved means for moving the arms out of engaging position with the material after it has been loaded upon the conveyor. I also provide means for adjusting the vertical angular position of the arms relative to the pile of loose material upon which it is operating and for controlling such angular position in any position of rotation of said arms, and other means for positively lifting the arms out of operative position when desired.

The invention may be best understood by reference to the accompanying drawings, in which:

Figure 1 is a view in side elevation of a machine constructed in accordance with my invention with certain parts broken away and with other parts thereof shown in section;

Figure 2 is a plan view of the machine shown in Figure 1;

Figure 3 is an enlarged detail plan view of one of the loading elements;

Figure 4 is a sectional view taken on line 4—4 of Figure 3;

Figure 5 is a detailed section taken on line 5—5 of Figure 3; and

Figure 6 is an outline sketch illustrating the operation of the arm elevating means.

Referring now to the details shown in the drawings, my invention is illustrated in connection with the conveyor apparatus which may be of any suitable construction so as to include a flight conveyor 10. In the form shown the apparatus includes a main frame 12 having endless tread tractor devices 11, 11, for moving the apparatus over the mine floor. The conveyor is suitably mounted on the main frame 12 by a pivotal connection which permits the conveyor to be tilted longitudinally of the machine.

In the form shown, the conveyor is mounted for pivotal movement on the forward cross-shaft 13 which supports the tread devices.

A driving motor 14 is mounted on the frame 12 and has suitable driving connections with the endless treads 11, 11, as for instance through armature pinion 15 and gears 16, 17 and 18, shaft 19 and chain sprocket 20, which is connected through chain 21 to the rear cross-shaft 22 having tread driving sprockets 23, 23, at opposite ends thereof.

Tilting movement of the conveyor frame 12 is afforded through the racks 25, 25, at the rear end of the frame which are engaged by pinions 26, 26, on the cross-shaft 27. A worm gear 28 on said shaft is rotated by a worm 29 on shaft 30 which is operatively connected to the motor, as for instance through the beveled gears 31, 32, and clutch member 33, on shaft 19, which also forms part of the driving connection for the endless tread tractor devices 11, as hereinbefore described.

The conveyor 10 shown herein is of the endless type and driven by any suitable means such as a motor 40 mounted at one side of the frame 12 and having driving connections with the conveyor 10 through armature pinion 41, gear 42, shaft 43, and chain sprocket 44 connected to the rear shaft 45 of the conveyor through chain 46 and chain sprocket 47 on the latter shaft.

The conveyor 10 shown herein has a substantially horizontal rear section 10ª, and an inclined front portion 10ᵇ extending to the idler sprockets 49, 49, on shaft 50 disposed at the front end of the main frame closely adjacent the ground. The ends of said conveyor shaft 50 are journaled at opposite ends in a frame support 51 forming part of a shoe member 52 which is adapted to have supporting engagement with the ground, as clearly shown in Figure 1.

Referring now more particularly to the features forming the subject matter of my invention, I provide a pair of gathering devices, one on each side of an adjacent the front end of the conveyor 10. The construction of these gathering devices is similar so that a description of one will suffice for an understanding of both.

In their broadest aspect each of said gathering devices consists of one or more arms 60, 60, which are pivotally connected at their inner ends to upright brackets 60ª, 60ª, of support 61, which support is rotated upon a forwardly inclined axis disposed substantially perpendicular to the upper face 62 of the shoe member 52. The upper face 62 referred to extends the full width of the machine and in effect forms an inclined apron over which the material is moved during the loading operation.

In the form shown, each of the rotating supports 61 are provided with two arms 60, 60, arranged diametrically opposite each other, as shown. The ends of the arms 60 project beyond the forward margin of the apron 62 and owing to their pivotal connection with the rotatable support, said arms may be moved in a path substantially parallel with said apron or at upwardly inclined angles thereto, as required by operating conditions, as will hereinafter more fully appear.

Suitable driving connections for each of the rotating supports 61 are provided. As shown herein, said connections consist of a shaft 70, disposed at one side of the frame 10 and connected to a shaft 71 by a universal joint 72, the latter shaft having a worm 73 thereon engaging with a worm gear 74 keyed on a downwardly extending hub 75 on the rotating support 61.

Any suitable means may be provided for driving the two shafts 70, 70. As shown herein, said shafts have connection with a cross shaft 80 through similar pairs of beveled gears 79, 79. The cross shaft 80 is driven by the motor 14 through armature pinion 81, gears 82, 83 and 84, shaft 85, and beveled gears 86 and 87, clutch members 88 and 89, shaft 90, and beveled gears 91 and 92, the latter gear being fixed on cross shaft 80.

The pairs of arms 60 at opposite sides of the conveyor are preferably driven in timed relation so as to alternately deposit their loads upon the lower end of the conveyor, as indicated in Figure 2.

The clutch members 88 and 89 are preferably of the friction type so as to permit slippage therebetween in case of excessive pressures upon the driven parts, as for instance, when unusually heavy obstructions are met by the rotating parts of the gathering mechanism.

Means are provided for automatically lifting the arms 60 in a predetermined position of rotation thereof after each of said arms have moved their load upon the conveyor 10.

For this purpose I provide a segmental cam member 95 in fixed relationship with the apron or top plate 62, one end 95ª of said cam member being arranged so as to be engaged by a roller 96 on each of said arms, and thus force the arm upwardly, about the time that said arm reaches the conveyor 10. The arrangement is such that the arm is raised to a substantial angle relative to the apron and conveyor before said arm swings off to one side of the conveyor during its rotative movement, whereby the load which has been carried rearwardly by the arm is released and transferred to the conveyor. The arm is rotated further in a slightly raised position as shown in Figure 1 until it reaches the position at one side of the apron 62 where the fixed cam member has a downwardly inclined face 97 terminating at the level of the apron, so as to permit the arm to resume a position substantially parallel with the apron, in which position it is again ready to gather its next load.

It will be understood that with the surfaces of fixed cam 95 arranged as aforesaid the path of movement of each of the arms will be controlled so that they are positively raised while they are above the conveyor and before they are moved across the side of said conveyor thus insuring that each load brought rearwardly by the sweeping movement of said arms will be deposited upon the conveyor rather than be carried across and off to one side of the conveyor by the rotating movement of said arm.

Owing to the arrangement whereby the ends of the arms move in a path extending somewhat beyond the front margin of the apron, I find it preferable to provide a relatively low cam member 109 arranged toward the front end of said apron so as to raise the arms slightly at this point as is best shown in Figure 4, and thus prevent the end of each arm from excessive digging into the ground while it is passing beyond the end of the apron.

I also provide adjustable means for controlling the vertical angular position of the arms at any position of rotation thereof which control means is particularly advantageous under varying conditions of gathering, as for instance, when there is a considerable pile of loose material closely adjacent the apron 62, and it is desired to scrape the material off the top of the pile rather than force the arm through the base of the pile. To meet such conditions I provide an auxiliary cam member 100, which in the form shown consists of the ring 101 having its major portion rotatably mounted in the shoe member 52 coaxially with the rotating support 61, and with its major portion disposed below the upper surface of the apron 62. A part of the ring 101 is provided with an upwardly projecting cam member 102, which in the form shown conforms substantially with the shape of the fixed cam 95, and is disposed so as to be movable just within the latter. Manually controllable means are provided for rotating the ring so that its upwardly projecting cam member 102 may be moved to any angular position desired, and thus cause the arms 60 to be raised when rotated.

Any suitable means for rotating the cam ring 100 may be provided. In the form shown this means comprises gear 103 mounted beneath the apron 62 and meshing with a toothed periphery 104 of said ring below said apron, the gear 103 being mounted on a shaft 105 which carries a beveled gear 106 at its lower end meshing with another beveled gear 107 on shaft 108 extending upwardly along each side of the frame member 12 into any suitable position where it may be rotated by the operator.

I also provide means whereby both of the arms 60, 60 may be positively raised out of operative position, as indicated in Figures 4 and 6. In the form shown this means comprises a shaft 111 loosely mounted concentric with the supporting plate 61 and extending therethrough. The upper end of the shaft is connected to each of the arms 60, 60, by means of a flexible cable 113 or the like attached to the upper end of spool 114 carried on the upper end of said shaft. Clutch means are provided at the lower end of said shaft normally maintaining the same in operative connection with the rotatable support 61 so as to rotate therewith.

In the form shown this clutch means comprises a sliding clutch member 115 normally maintained in frictional contact with the inner face 117 of the worm gear 74, which as already described, forms part of the driving connection for said rotatable support 61. An endwise movable rod 115$^a$ has connection with the clutch member 115 through a pin 116 movable longitudinally in a slot 111$^a$ formed in the walls of the shaft 111. An operating lever 119 is connected with the lower end of the rod 115$^a$, said operating lever having any suitable control devices connected thereto. The arrangement is such that by downward movement of the operating lever 119 the rod 115$^a$ with the pin 116 moves the clutch member 115 downwardly, and out of driving engagement with the worm gear 74, and upon further movement of said clutch member the same is moved into frictional engagement in a socket 121 which is rigid with shoe member 52. As soon as this frictional contact is established, further rotation of the shaft 111 is retarded with respect to the rotating support 61 so as to cause the flexible cables to wind upon the spool 114 and positively raise the two arms 60, 60, as indicated in Figure 6.

The frictional contact of the sliding clutch member 115 in the socket 121 is preferably of such limited value, however, that the parts are permitted to slip as soon as the arms are in fully raised position and thus avoid injury to the parts in case the operator fails to release the friction clutch promptly.

The apparatus is transportable from place to place on its tractor devices by elevating the conveyor with its front end frame or shoe portion 52. Before the loading operation the shoe member 52 is dropped to a position adjacent the pile of loose material to be loaded and the machine is advanced to a position where the arms engage and sweep the loose material along the inclined apron and onto the conveyor. The entire machine is advanced as the loading operation proceeds, it usually being desirable to project the front edge of the apron under the pile of loose material.

By reason of the pivotal mounting of the arms the latter are relatively free to swing upwardly and adjust themselves to the arrangement and amount of material with which they engage and as the material is moved upwardly and rearwardly onto the conveyor each arm is positively raised by engagement with the fixed cam devices so that each load of material will be released from the arms and deposited upon the main conveyor 10.

The movable cam devices also provide means for positively elevating the arms at any predetermined position of rotation, said last named means being under the control of the operator which may be desirable under certain conditions of operation which may be encountered during the loading operation. When it is desired to move either or both arms out of operative position entirely, the clutch member 115 is manipulated so as to cause the flexible cables 113 to be wound about the spool 114 in the manner already described.

While I have shown and described one embodiment of my invention, it will be understood that the construction and arrangement of the various parts may be altered or changed without departing from the spirit and scope thereof. Furthermore, I do not wish to be construed as limiting myself to the precise form illustrated, excepting as it may be limited in the appended claims.

I claim as my invention:

1. In a loading machine, a frame, a conveyor having one end supported on said frame adjacent the ground, and rotatable gathering devices disposed adjacent said conveyor, including an arm normally movable in a substantially horizontal orbital path to sweep material upon said conveyor, and adjustable means for positively elevating said arm at any position of rotation of said arm.

2. In a loading machine, a frame, a conveyor having one end supported on said frame adjacent the ground and rotatable gathering devices disposed adjacent said conveyor, including an arm movable in a substantially horizontal orbital path to sweep material upon said conveyor, and rotatably movable cam means for positively elevating said arm from said conveyor at varying positions of rotation of said arm, and means for controlling said movable cam at will.

3. In a gathering device for gathering loose material, a conveyor, an inclined apron adjacent said conveyor, and gathering means comprising a support rotatable on an axis substantially perpendicular to said apron, a material engaging arm projecting radially from said rotatable support and pivotally connected thereto for vertical movement, and cam means on said apron adapted to raise said arm at a predetermined position relative to said conveyor, and other cam means adapted to raise said arm when the same projects forwardly beyond the front end of said apron.

4. In a loading machine, a frame, a conveyor having one end supported on said frame adjacent the ground, and rotatable gathering devices disposed adjacent said conveyor, including an arm movable in a substantially horizontal orbital path to sweep material upon said conveyor, cam means for positively elevating said arm from said conveyor after it has moved its load upon said conveyor, and flexible means for positively raising said arm out of operative position.

5. In a loading machine, a frame, a conveyor having one end supported on said frame adjacent the ground, and rotatable gathering devices disposed adjacent said conveyor, including an arm movable in a substantially horizontal orbital path to sweep material upon said conveyor, cam means for positively elevating said arm from said conveyor after it has moved its load upon said conveyor, a shaft coaxial with the axis of said arm, and a flexible member connected to said shaft and said arm for positively raising said arm out of operative position.

6. In a loading machine, a frame, a conveyor having one end supported on said frame adjacent the ground, and rotatable gathering devices disposed adjacent said conveyor, including an arm movable in a substantially horizontal orbital path to sweep material upon said conveyor, rotatably movable cam means for positively elevating said arm from said conveyor at varying positions of rotation of said arm, and flexible means for positively raising said arm out of operative position independently of said rotatably movable cam means.

7. In a loading machine, a frame, a conveyor having one end supported on said frame adjacent the ground, and rotatable gathering devices disposed adjacent said conveyor, including an arm movable in a substantially horizontal orbital path to sweep material upon said conveyor, rotatably movable cam means for positively elevating said arm from said conveyor at varying positions of rotation of said arm, a shaft coaxial with the axis of said arm, and a flexible member connected to said shaft and said arm for positively raising said arm out of operative position independently of said rotatably movable cam means.

8. In a loading machine, a frame, a conveyor having one end supported on said frame adjacent the ground, rotatable gathering devices disposed adjacent said conveyor including an arm movable in a substantially horizontal orbital path to sweep material upon said conveyor means for rotating said gathering devices, and flexible means selectively connectible with said means for rotating said gathering devices for positively raising said arm out of operative position.

9. In a loading machine, a frame, a conveyor having one end supported on said frame adjacent the ground, rotatable gathering devices disposed adjacent said conveyor including an arm movable in a substantially horizontal orbital path to sweep material upon said conveyor, means for rotating said gathering devices including a separate gear having operative connection with each of said gathering devices, and means selectively connectible with said gear and coaxial therewith for positively raising said arm out of operative position.

10. In a loading machine, a frame, a conveyor having one end supported on said frame adjacent the ground, rotatable gathering devices disposed adjacent said conveyor including an arm movable in a substantially horizontal orbital path to sweep material upon said conveyor, means for rotating said gathering devices including a separate gear having operative connection with each of said gathering devices, and means selectively connectible with said gear and coaxial therewith for positively raising said arm out of operative position, including a shaft, and a flexible member interposed between said shaft and said arm.

11. In a loading machine, a frame, a conveyor having one end supported on said frame adjacent the ground, rotatable gathering devices disposed adjacent said conveyor, including an arm movable in a substantially horizontal orbital path to sweep material upon said conveyor, and rotatably movable cam means for positively elevating said arm from said conveyor at varying positions of rotation of said arm, means for rotating said gathering devices, and flexible means selectively connectible with said means for rotating said gathering devices for positively raising said arm out of operative position.

12. In a loading machine, a frame, a conveyor having one end supported on said frame adjacent the ground, rotatable gathering devices disposed adjacent said conveyor, including an arm movable in a substantially horizontal orbital path to sweep material upon said conveyor, and rotatably movable cam means for positively elevating said arm from said conveyor at varying positions of rotation of said arm, means for rotating said gathering devices including a separate gear having operative connection with each of said gathering devices, and means selectively connectible with said gear and coaxial therewith for positively raising said arm out of operative position.

13. In a loading machine, a frame, a conveyor having one end supported on said frame adjacent the ground, rotatable gathering devices disposed adjacent said conveyor, including an arm movable in a substantially horizontal orbital path to sweep material upon said conveyor, and rotatably movable cam means for positively elevating said arm from said conveyor at varying positions of rotation of said arm, means for rotating said gathering devices including a separate gear having operative connection with each of said gathering devices, and means selectively connectible with said gear and coaxial therewith for positively raising said arm out of operative position, including a shaft and a flexible member interposed between said shaft and said arm.

14. In a gathering device for gathering loose material, a conveyor, an inclined apron adjacent said conveyor, and rotatable gathering devices disposed adjacent said conveyor, including an arm movable in a substantially horizontal orbital path to sweep material upon said conveyor, cam means on said apron adapted to raise said arm at a predetermined position relative to said conveyor, and other rotatably movable cam means for positively elevating said arm from said conveyor at varying positions of rotation of said arm.

15. In a gathering device for gathering loose material, a conveyor, an inclined apron adjacent said conveyor, and rotatable gathering devices disposed adjacent said conveyor, including an arm movable in a substantially horizontal orbital path to sweep material upon said conveyor, cam means on said apron adapted to raise said arm at a predetermined position relative to said conveyor, and other rotatably movable cam means for positively elevating said arm from said conveyor at varying positions of rotation of said arm, and means for controlling the position of said movable cam at will.

16. In a loading machine, a frame, a conveyor having one end supported on said frame adjacent the ground, and rotatable gathering devices disposed adjacent said conveyor, including an arm normally movable in a substantially horizontal orbital path to sweep material upon said conveyor, and adjustable cam means for positively elevating said arm at any desired position of rotation of said arm.

Signed at Chicago, in the county of Cook and State of Illinois, this 15th day of January, A. D. 1929.

CHARLES A. PRATT.